United States Patent [19]
Habermeier et al.

[11] 4,191,836
[45] Mar. 4, 1980

[54] ANTHRANILATES OF POLYOXYETHYLATED CARBOXYLIC ACID

[75] Inventors: Jürgen Habermeier, Pfeffingen; Roland Moser, Basel, both of Switzerland

[73] Assignee: Ciba-Geigy Corporation, Ardsley, N.Y.

[21] Appl. No.: 966,420

[22] Filed: Dec. 4, 1978

[30] Foreign Application Priority Data

Apr. 27, 1978 [CH] Switzerland .................. 4586/78

[51] Int. Cl.$^2$ .................. C07C 101/54; C08G 59/54
[52] U.S. Cl. .................. 560/49; 528/64; 528/68; 528/111; 528/123; 528/327; 528/341
[58] Field of Search .................. 560/49

[56] References Cited

U.S. PATENT DOCUMENTS

| 3,238,203 | 3/1966 | Krapcho | 560/49 |
| 3,817,940 | 6/1974 | Blahak et al. | 560/49 |
| 3,929,863 | 12/1975 | Blahak et al. | 560/49 |
| 3,975,428 | 8/1976 | Blahak et al. | 560/49 |
| 4,007,239 | 2/1977 | Blahak et al. | 560/49 |

FOREIGN PATENT DOCUMENTS

| 847680 | 2/1977 | Belgium | 560/49 |
| 847681 | 2/1977 | Belgium | 560/49 |
| 7216484 | 6/1973 | Netherlands | 560/49 |

OTHER PUBLICATIONS

Phillips, J.A.C.S., 73, pp. 5557–5559 (1951).
Wong et al., Elastomerics, pp. 37–42 (1977).

Sherman Williams Technical Bulletin, 152 at p. 4.

Primary Examiner—Bernard Helfin
Assistant Examiner—G. T. Breitenstein
Attorney, Agent, or Firm—Joseph F. DiPrima

[57] ABSTRACT

Bis-anthranilates of the formula

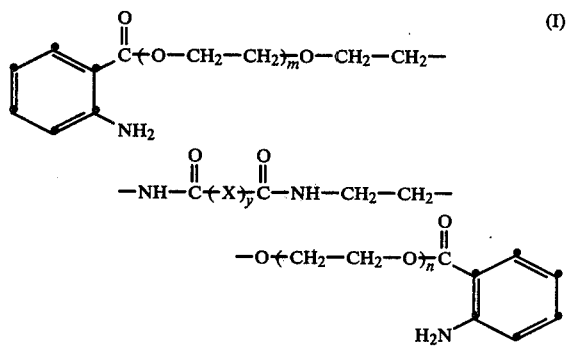

or mixtures thereof, in which, in the formula, m and n are each 0 or a number from 1 to 5 and the sum of m and n must be at least 1, y is 0 or 1 and X is an alkylene radical having 1 to 8 C atoms, para- or meta-phenylene or para-cyclohexylene.

The novel compounds are valuable chain extenders and crosslinking agents for the production of polyurethanes and polyurea resins and are also suitable as curing agents for epoxide resins.

7 Claims, No Drawings

ANTHRANILATES OF POLYOXYETHYLATED CARBOXYLIC ACID

The present invention relates to bis-anthranilates of polyoxyethylated dicarboxylic acid diamides, processes for their preparation and their use as chain extenders and crosslinking agents in the production of polyurethanes and polyurea resins or as curing agents for epoxide resins.

4,4'-Methylene-bis-(o-chloroaniline) (MOCA) has for a long time been one of the best chain extenders and crosslinking agents introduced into polyurethane and polyurea technology, since MOCA, especially in the production f polyurethane elastomers or flexible foams, has favourable processing characteristics in respect of the reactivity and, moreover, imparts outstanding mechanical properties to the crosslinked polymers. As is known, however, there is a suspicion that MOCA may be carcinogenic (cf. "Elastomerics", March 1977, page 37) and there has been no lack of attempts to replace MOCA by crosslinking agents which are equivalent in respect of the very advantageous processing characteristics and end characteristics of the polymers.

In Technical Bulletin 152 of the "Sherwin-Williams Company" (USA) bis-anthranilates of linear aliphatic diols are mentioned. In "Elastomerics", March 1977, page 37 et seq., 4,4'-methylene-bis-anthranilates are proposed as a replacement for MOCA. Furthermore, in the two Belgian Pat. Nos. 847,680 and 847,681 bis-anthranilates of diols containing a N,N-heterocyclic radical, for example 1,3-di-(2'-hydroxyethyl)-benzimidazolone and 1,3-di-(2'-hydroxyethyl)-5,5-dimethylhydantoin, are dissolved as chain lengtheners for polyurethanes.

It has now been found that when bis-anthranilates of polyoxyethylated dicarboxylic acid diamides, for example N,N'-bis-(anthranoyloxyethoxyethyl)-isophthalic acid diamide, are used as chain extenders and crosslinking agents in urethane and urea formulations, elastomers with outstanding mechanical strength are obtained. Compared with the known crosslinking agents for urethanes, the novel bis-anthranilates also have the advantage that they can be processed easily at room temperature in the urethane and urea formulations and are readily soluble in these formulations and, moreover, are suitable for cold curing.

The present invention thus relates to novel bisanthranilates of the formula I

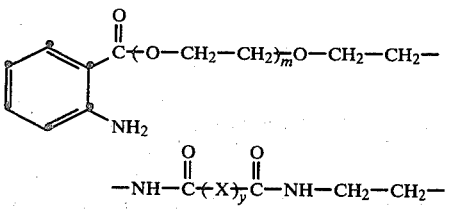
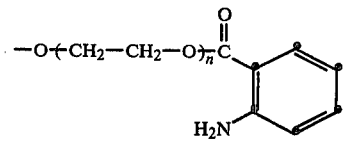

or mixtures thereof, in which, in the formula, m and n are each 0 or a number from 1 to 5 and the sum of m and n must be at least 1, y is 0 or 1 and X is an alkylene radical having 1 to 8 C atoms, para- or meta-phenylene or para-cyclohexylene.

Preferably, in the formula I, m and n are each a number from 1 to 3 but especially are each 1, y is 1 and X is ethylene, butylene, heptylene or para- or meta-phenylene.

The bis-anthranilates of polyoxyethylated aromatic dicarboxylic acid amides, especially N,N'-bis-(anthranoyloxyethoxyethyl)-isophthalic acid diamide, are of particular interest.

The compounds of the formula I can be prepared by reacting polyoxyethylated dicarboxylic acid diamides of the formula II

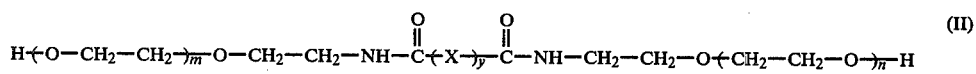

or mixtures thereof, in which, in the formula, m, n, y and X are as defined in formula I, with 1.8 to 2.5 mols of isatoic anhydride, preferably in the presence of an alkaline catalyst, to give compound of the formula I.

The starting materials used in this process are preferably compounds of the formula II in which m and n are each a number from 1 to 3, especially 1, y is 1 and X is ethylene, butylene, heptylene or para- or meta-phenylene.

In particular, the compounds of the formula II which are used are the polyoxyethylated aromatic dicarboxylic acid amides, especially N,N'-bis-(β-hydroxyethoxyethyl)-isophthalic acid diamide.

The compounds of the formula II have not yet been described in the literature and can be prepared using the process described in "Journal of American Chemical Society", volume 73 (1951), 5557 et seq., by transesterifying 1 mol of a dicarboxylic acid diester of the formula III

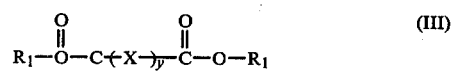

in which the two $R_1$s are preferably a lower alkyl group, with 2 mols of a poly-(oxyethylene)-glycolamine of the formula IV

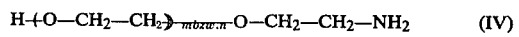

and distilling off the alcohol formed during the transesterification. In this process, the poly-(oxyethylene)-glycolamine is preferably employed in molar excess and this excess is removed from the reaction mixture by distillation after the reaction has taken place.

Another process for the preparation of compounds of the formula II comprises subjecting an N,N'-bis-(β-hydroxyethyl)-dicarboxylic acid diamide of the formula V

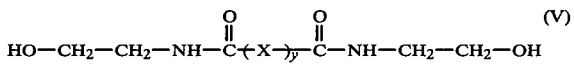

$$\text{HO-CH}_2\text{-CH}_2\text{-NH-}\overset{\overset{O}{\|}}{C}\text{-(X-)}_y\text{-}\overset{\overset{O}{\|}}{C}\text{-NH-CH}_2\text{-CH}_2\text{-OH} \quad (V)$$

in which y is as defined in formula I, which has been prepared in a first stage, to an addition reaction, in a second stage, with m+n mols of ethylene oxide in the presence of a catalyst. Compounds of the formula II are obtained in the form of a mixture of oligomers by this process.

The N,N'-bis-($\beta$-hydroxyethyl)-dicarboxylic acid diamides of the formula V prepared in the first stage are known compounds and can be prepared by the process described in "Journal of American Chemical Society", volume 73, (1951), 5557 et seq., by transesterifying the dicarboxylic acid esters of the formula III with the stoichiometric amount of ethanolamine and distilling off the alcohol formed during the transesterification.

In a preferred embodiment for the preparation of the compounds, according to the invention, of the formula I, the starting compounds are used in stoichiometric amounts, i.e. 2 mols of isatoic anhydride are employed per 1 mol of the polyoxyethylated dicarboxylic acid diamide of the formula II.

The preparation of the compounds of the formula I is preferably carried out in the presence of an organic solvent or solvent mixture. Suitable solvents are, in particular, the aprotic solvents, such as dioxan, chloroform, toluene, dimethylformamide and dimethylacetamide.

The reaction temperature for the preparation of the compounds of the formula I can be from 30° to 160° C. Preferably, the reaction is carried out in the temperature range of 50° to 130° C.

Preferably, the conversion reaction is catalysed by bases, and alcoholates, including those of the starting diols, alkali metal hydroxides or alkaline earth metal hydroxides, tertiary amines and ammonium bases or other substances having a basic action can be used. Frequently, basic impurities in the starting materials also suffice. Catalysts can be used in amounts of 0.01 to 10 mol %, based on the amount of isatoic anhydride employed.

The reaction of isatoic anhydride with alcohols, which, as is known, proceeds with the elimination of $CO_2$, is described in detail in U.S. Pat. No. 3,123,631.

Another process for the preparation of the compounds of the formula I comprises esterifying 1 mol of the polyoxyethylated dicarboxylic acid diamides of the formula II with 2 mols of o-nitrobenzoic acid and then reducing the nitro groups in a known manner to the amino groups.

The compounds of the formula I can also be prepared by the transesterification process by transesterifying the polyoxyethylated dicarboxylic acid diamides of the formula II with anthranilates, preferably alkyl-anthranilates, having 1 to 4 C atoms in the alkyl group, the alcohol formed during the reaction being distilled off.

The compounds, according to the invention, of the formula I are solid substances at room temperature and have low softening points or melting points (30°–120° C.). The compounds according to the invention are readily soluble in many organic solvents, such as dioxan, toluene, benzene, dichlorobenzene and dimethylformamide. Furthermore, the novel compounds also have good solubility at room temperature in higher-molecular diols, diol-ether compounds and many short-chain polyesters containing hydroxyl groups.

As mentioned initially, the compounds according to the invention are a valuable replacement for 4,4'-methylene-bis-(o-chloroaniline). They can therefore be used in an analogous manner. In particular, the compounds according to the invention are suitable as chain extenders in polyurethanes and as crosslinking agents for the production of polyurea resins and can advantageously be employed for the preparation of such resin formulations at room temperature.

Moreover, the bis-anthranilates according to the invention are valuable curing agents for epoxide resins.

PREPARATION OF THE STARTING COMPOUNDS

Example A

Terephthalic acid bis-($\beta$-hydroxyethoxyethylamide)

In a 1 liter glass apparatus fitted with a stirrer, a thermometer, a reflux condenser and external heating, 420 g (4 mols) of technical grade diethyleneglycolamine ($\beta$-aminoethoxyethanol) are added to 194 g (1 mol) of dimethyl terephthalate and the mixture is warmed to 110° C., with stirring, whereupon a clear, colourless solution forms. This solution is stirred for 5 hours at 110°–125° C., methanol being refluxed gently, and is then cooled to room temperature. The desired substance crystallises out in the form of colourless crystals. 150 ml of acetone are added and the crystals are filtered off with strong suction.

After drying, the crude product is obtained in 83.6% yield (284.5 g). For purification, the product is recrystallised from 350 ml of methanol.

This yields 229.6 g (67.45% of theory) of pure product which melts at 148°–150° C. The H-NMR spectrum (60 Mc) shows, by the ratio of aromatic to aliphatic (C-$\underline{H}$) protons, that the product has the formula II in which m, n and y are each 1 and X is p-phenylene. Combustion analysis also shows this. For $C_{16}H_{24}N_2O_6$ the following values are obtained

| Found: | Calculated: |
| --- | --- |
| 56.50% C | 56.46% C |
| 7.10% H | 7.11% H |
| 8.30% N | 8.23% N |

The purity was also determined by gas chromatography after silylation of the product (with "Trisil-BSA" from Pierce) (conditions: oven 300° C.; detector 350° C.; column SP 2100). The recrystallised product proved to be 99.3% pure.

Example B

Isophthalic acid bis-(p-hydroxyethoxyethylamide)

Analogously to Example A, 194 g (1 mol) of dimethyl isophthalate are mixed with 420 g (4.0 mols) of diethyleneglycolamine ($\beta$-aminoethoxyethanol) and reacted, the temperatures and reaction time described in Example A being maintained.

Subsequently, the methanol formed during the reaction is distilled off in a rotary evaporator at 1950 Pa/100° C. The excess diethyleneglycolamine is then distilled off at 130° C./65 Pa. 208 g (99% of theory) of diethyleneglycolamine are recovered. The purity of this regenerated product determined by gas chromatography is 95.6%. This regenerated product can be used direct for further batches.

The desired product is a yellowish melt which solidifies to a clear solid. 333 g (97.7% of theory) are obtained. For purification, the product is dissolved in 300 ml of boiling ethanol, the solution is cooled to 10° C. and 300 ml of ether are added. After drying, 190 g (55.8% of theory) of colourless crystals with a melting point of 76°–78° C. are obtained. A further 95 g of pure product are obtained from the mother liquor. Total yield of pure product: 285 g (83.6% of theory). Analysis by gas chromatography (GC) after silylation of the product (with "Trisil-BSA" from Pierce) shows that the product has a purity of 97%. The H-NMR spectrum (60 Mc) and elementary analysis are in accord with the compound of the formula II in which m, n and y are each 1 and X is m-phenylene. The values obtained for $C_{16}H_{24}N_2O_6$ were

| Found: | Calculated: |
|---|---|
| 56.41% C | 56.46% C |
| 7.08% H | 7.11% H |
| 8.21% N | 8.23% N |

Example C

Sebacic acid bis-(β-hydroxyethoxyethylamide)

115.2 g (0.5 mol) of dimethyl sebacate and 210.2 g (2.0 mols) of diethyleneglycolamine (β-aminoethoxyethanol) are mixed in a glass apparatus which has a capacity of 750 ml and is fitted with a stirrer, a thermometer and a descending condenser. The mixture is warmed to an internal temperature of 130°–140° C., with stirring, and the reaction proceeds, methanol distilling off. 24 ml (59.3% of theory) of methanol have distilled off after 1 hour and 36 ml after 2 hours. The reaction mixture is transferred to a round-bottomed flask and concentrated to constant weight in a rotary evaporator at 130° C./52 Pa. This yields 188.2 g (100% of theory) of the crude product in the form of a viscous liquid which crystallises completely on cooling to room temperature.

92 g (corresponding to 0.875 mol) of the excess amine (theory: 1.0 mol) are recovered. The recovered amine is 97.5% pure according to GC analysis and can be used direct for further batches.

The crude product can be recrystallised from 550 ml of ethanol (95% pure). After crystallising, 150 ml of ether are also added and the product is filtered off with suction and dried. The desired pure product is obtained in the form of colourless crystals with a melting point of 105.6°–107.2° C. The yield of pure product is 132.3 g (70.2% of theory).

GC analysis (silylation with "Trisil BSA" from Pierce; oven 265° C.; column SP 2100, carrier He; detector FID, 350° C.) shows that the purity of the product is 98.5% (1.5% of 1 impurity present). The H-NMR spectrum (60 Mc) is in accord with the compound of the formula II, in which m, n and y are each 1 and X is n-octylene. Combustion analysis gives, for $C_{18}H_{36}N_2O_6$:

| Found: | Calculated: |
|---|---|
| 57.35% C | 57.40% C |
| 9.61% H | 9.64% H |
| 7.45% N | 7.44% N |

Example D

Oxalic acid bis-(β-hydroxyethoxyethylamide)

73.07 g (0.5 mol) of diethyl oxalate are heated together with 210.2 g (2.0 mols) of diethyleneglycolamine (β-aminoethoxyethanol) at 116°–125° C. for 4 hours, with stirring. The reaction takes place with the elimination of ethanol; the ethanol is distilled off through a descending condenser.

The excess diethyleneglycolamine (1 mol) is then distilled off at 130° C./65 Pa. 103.5 g (98.5% of theory) are recovered; the purity of the regenerated product is 98.6% and the product is used for further reactions.

The crude bis-amide is obtained in the form of a yellow, clear melt, which crystallises out when cooled slowly to 20° C. Yield: 130.0 g (98.38% of theory). GC analysis (method as in Example C) shows that this crude product already has a purity of 99.1%.

The product can be recrystallised from 1:1 ethanol/ether. 127 g (96.1% of theory) of pure product with a melting point of 99.3°–100.1° C. are obtained. The H-NMR spectrum (60 Mc) and elementary analysis are in accord with the compound of the formula II in which m and n are each 1 and y is 0. The values obtained for $C_{10}H_{20}N_2O_6$ were

| Found: | Calculated: |
|---|---|
| 45.48% C | 45.45% C |
| 7.67% H | 7.63% H |
| 10.64% N | 10.60% N |

Example E

Cis/trans-cyclohexane-1,4-dicarboxylic acid bis-(β-hydroxyethoxyethylamide)

210.2 g (2.0 mols) of diethyleneglycolamine (β-aminoethoxyethanol) are added to 100.1 g (0.5 mol) of dimethyl cyclohexanedicarboxylate (cis/trans mixture) and the mixture is stirred for 5 hours at 120°–130° C.; the methanol formed during the reaction is distilled off.

The excess diethyleneglycolamine (theory: 1 mol) is then distilled off at 135°/65 Pa. 105.1 g (100% of theory) of the amine are recovered; the amine has a purity of 98.1% according to GC analysis.

The desired bis-amide is obtained as the crude product in 90.64% yield (157.0 g). According to GC analysis, the crude product is about 85% pure and consists to the extent of about 50% of the cis-bis-amide and to the extent of about 50% of the trans-bis-amide.

For purification, the crude product is dissolved in 250 ml of ethanol at 70° C., the solution is cooled to 10° C., 200 ml of ether are added and the solvent mixture is decanted off from the crystal slurry which has precipitated. The crystal slurry is digested with 250 ml of acetone, the mixture is cooled to −20° C. and the product is filtered with suction and dried under a high vacuum at 20° C. over $P_2O_5$. This yields 93 g (53.6% of theory) of pale yellow crystals which start to melt at room temperature.

The H-NMR spectrum (60 Mc) confirms that the compound of the formula II in which m and n are each 1 and X is p-cyclohexylene has been obtained. Elementary analysis for $C_{16}H_{30}N_2O_6$ gives:

| Found: | calculated: |
|---|---|
| 55.2% C | 55.48% C |
| 8.8% H | 8.73% H |
| 7.9% N | 8.01% N |

Example F

Adipic acid bis-(β-hydroxyethoxyethylamide)

348.4 g (2.0 mols) of dimethyl adipate are mixed with 840.8 g (8.0 mols) of diethyleneglycolamine ($H_2N-CH_2-CH_2-O-CH_2-CH_2-OH$) and the mixture is warmed to 125° C., with stirring.

The methanol formed during the reaction is distilled off continuously. After 1.5 hours, 90 g of methanol are measured and after applying a partial water-pump vacuum (about 1300 Pa) the remaining 38 g of methanol are obtained after a further 30 minutes (total: 128 ml=100% of theory). The reaction mixture is subjected to a distillation treatment at 135° C. under 52 Pa, the excess diethyleneglycolamine (theory: 4 mols=420.4 g) being distilled off. 408 g (97% of theory) of regenerated amine with a purity of 93.5% of theory (according to GC analysis) are obtained. This amine can be used direct for further reactions.

The desired bis-amide is a clear, pale yellow liquid which rapidly crystallises completely at room temperature. 632 g (98.63% of theory) of this product are obtained. The crude product has a purity of 93.7% (according to GC analysis).

The product is recrystallised from 550 ml of ethanol and this yields 371 g (57.9% of theory) of fine, colourless crystals which melt at 74°-75° C. A further 135 g of pure substance can be obtained from the mother liquor (total yield of pure product: 78.9% of theory).

According to GC analysis, the pure product is 98.6% pure.

The H-NMR and IR spectra are in accord with the compound of the formula II in which m and n are each 1 and X is n-butylene. Combustion analysis for $C_{14}H_{28}N_2O_6$ gives

| Found: | Calculated: |
|---|---|
| 8.80% H | 8.81% H |
| 8.74% N | 8.75% N |

PREPARATION EXAMPLES

EXAMPLE 1

Bis-anthranilate of the diol according to Example A 229.8 g (0.675 mol) of the terephthalic acid bis-(β-hydroxyethoxyethylamide) prepared according to Example A (with a melting point of 148°-150° C.) are stirred into a mixture of 0.7 liter of toluene and 300 ml of dimethylformamide at 80° C. whereupon a clear colourless solution forms. 0.63 g of potassium hydroxide powder and 80.77 g of isatoic anhydride (technical grade) are added. The reaction starts immediately with vigorous evolution of $CO_2$. After 45 minutes at 80°-90° C., a further 0.63 g of potassium hydroxide and 80.77 g of isatoic anhydride are added. After a total of 2 hours, the remaining amount of 80.77 g of isatoic anhydride is added (total amount: 242.3 g=1.485 mols). The reaction mixture is then stirred for a further 120 minutes at 120° C. and is then completely concentrated at 130° C./1950 Pa.

The residue is then dried to constant weight at 145° C. under 39 Pa.

This yields 390 g (99.8% of theory) of the desired bis-anthranilate in the form of a clear, pale brown, glassy product. The bis-anthranilate softens at 50° C. (according to Kofler) and melts at about 75° C. to give a liquid of low viscosity. The H-NMR spectrum and elementary analysis are in accord with the compound of the formula I in which m, n and y are each 1 and X is p-phenylene. The following values are found for $C_{30}H_{34}N_2O_8$:

| Found: | Calculated: |
|---|---|
| 62.0% C | 62.27% C |
| 5.9% H | 5.92% H |
| 9.7% N | 9.68% N |

The product can be purified by dissolving it in chloroform and extracting by shaking, twice with 10% ammonia water and once with water. The chloroform is then removed by distillation and the product is dried to constant weight at 125° C./39 Pa. The product purified in this way is very suitable for the intended applications.

The product purified in this way is clear, transparent and pale yellow in colour.

For analytical purposes, the product can be recrystallised from ethanol or methanol. Colourless crystals with a melting point of 114°-115° C. are obtained.

The elementary analysis of the recrystallised bis-anthranilate gives:

| Found: | Calculated: |
|---|---|
| 62.15 % C | 62.27% C |
| 6.00% H | 5.92% H |
| 9.63% N | 9.68% N |

The novel bis-anthranilate dissolves readily at 20° C. in ethanol, diethylene glycol, chloroform, dimethylformamide, acetone and the like. On warming, 2.5 g of the novel bis-anthranilate dissolve in 1.5 ml of poly-(ethylene glycol) with a molecular weight of 400. On cooling to room temperature, a clear, viscous solution forms which can be handled easily and which does not change even after long storage.

EXAMPLE 2

Bis-anthranilate of the diol according to Example B 160 g (0.47 mol) of the isophthalic acid bis-(β-hydroxyethoxyethylamide) prepared according to Example B are dissolved in 550 ml of toluene and 220 ml of dimethylformamide at 80° C. With stirring 0.4 g of potassium hydroxide powder is added and 56.2 g of isatoic anhydride are introduced.

The reaction starts immediately with the formation of $CO_2$. After one hour, a further 0.4 g of potassium hydroxide powder and 56.2 g of isatoic anhydride are added. After a further 90 minutes, a further 0.4 g of potassium hydroxide and 56.2 g of isatoic anhydride are added (total amount: 168.6 g, corresponding to 1.034 mols). The reaction mixture is then stirred for a further 3 hours at 120° C. and is completely concentrated at 120° C./2600 Pa. The residue is then dried to constant weight at 130° C./65 Pa.

This yields 272 g (100% of theory) of the crude bis-anthranilate in the form of a glassy, transparent, pale brown product which softens at 46° C. (according to Kofler).

The thin layer chromatogram (TLC) (solvent cyclohexane/acetone 1:1) shows that the desired product has formed in good purity. The traces of by-products are removed by the purification method described in Example 1.

The pure product gives the following elementary analysis for $C_{30}H_{34}N_4O_8$:

| Found: | Calculated: |
|---|---|
| 62.16% C | 62.27% C |
| 5.90% H | 5.92% H |
| 9.70% N | 9.68% N |

The IR and H-NMR spectra are also in accord with the compound of the formula I in which m, n and y are each 1 and X is m-phenylene.

At 20° C., the novel bis-anthranilate is readily soluble in methanol, ethanol, chloroform, acetone and dimethylformamide. It is insoluble in water.

If 2.0 g of the novel bis-anthranilate are dissolved in 1.5 g of polyethylene glycol 425 at 70° C. and the solution is cooled to room temperature, a clear solution is obtained which can be handled easily and which remains unchanged even on long storage. A clear mixture of 1 g of the bis-anthranilate and 2 g of the polyester with hydroxyl end groups which has the tradename "Desmophen 2200", which is prepared at 90° C. and is highly viscous at room temperature, also remains unchanged over a long period at room temperature.

EXAMPLE 3

Bis-anthranilate of the diol according to Example C 94.12 g (0.25 mol) of sebacic acid bis-($\beta$-hydroxyethoxyethylamide) are dissolved in a mixture of 500 ml of toluene and 200 ml of dimethylformamide, with stirring, at 80° C. 0.1 g of potassium hydroxide and 28.55 g of isatoic anhydride are added to the clear colourless solution. The reaction starts immediately with the evolution of $CO_2$. After 45 minutes, a further 0.1 g of potassium hydroxide and 28.55 g of isatoic anhydride are added. After a further 60 minutes, a further 0.1 g of potassium hydroxide and 28.55 g of isatoic anhydride (total amount: 85.64 g=0.525 mol) are added.

The reaction mixture is then stirred for a further 2 hours at 100° C.

5 g of active charcoal are added to the reaction solution and the mixture is stirred for 10 minutes at 100° C., cooled to 40° C. and filtered. The filtrate is completely concentrated and the residue is dried to constant weight at 130° C. under 52 Pa. This crude product is dissolved in 400 ml of chloroform and washed as described in Example 2.

After separating off, the product is worked up as in Example 2. This yields 144 g (94.2% of theory) of the desired bis-anthranilate in the form of a clear, yellow-brown resin which softens at about 50° C.

Elementary analysis gives, for $C_{32}H_{46}N_4O_8$:

| Found: | Calculated: |
|---|---|
| 62.52% C | 62.59% C |
| 7.47% H | 7.55% H |

| Found: | Calculated: |
|---|---|
| 9.20% N | 9.13% N |

The IR and H-NMR spectra are also in accord with the compound of the formula I in which m, n and y are each 1 and X is n-octylene.

The gas chromatogram (oven temperature 360° C.; silylation with "Trisil BSA", column SP 2100; carrier He; detector WLF) shows that the product is 90% pure and contains, as the sole impurity, about 10% of the corresponding monoanthranilate.

EXAMPLE 4

Bis-anthranilate of the diol according to Example D 88.08 g (0.33 mol) of oxalic acid bis-($\beta$-hydroxyethoxyethylamide) are warmed in 500 ml of toluene and 250 ml of dimethylformamide to 80° C., with stirring. 0.22 g of sodium hydroxide and 39.5 g of isatoic anhydride are then added all at once and the mixture is stirred vigorously. The reaction starts immediately with the elimination of carbon dioxide. After 60 minutes a further 0.22 g of sodium hydroxide and 39.5 g of isatoic anhydride are added. After a further 60 minutes, a final addition of 0.22 g of sodium hydroxide and 39.5 g of isatoic anhydride is made (total amount of isatoic anhydride: 118.43 g=0.726 mol) and the reaction mixture is warmed to 100°–105° C. After 2 hours at 100°–105° C., 5 g of active charcoal are added and the mixture is stirred for a further 10 minutes, cooled to 30°–40° C. and filtered. The clear solution is completely concentrated and the residue is then freed from readily volatile constituents at 130° C./65 Pa. The desired product is obtained as the crude substance in 99.9% yield (165.8 g).

For purification, the product is dissolved in 350 ml of chloroform and the solution is washed twice with 100 ml of $NH_3$ solution (10%) and once with 150 ml of water. After separating off the aqueous phase, the chloroform solution is concentrated and the residue is then dried to constant weight at 130° C./52 Pa. This yields 129.7 g (78.2% of theory) of a crystal clear, pale brown substance.

Both the H-NMR spectrum and the IR spectrum show that the product corresponds to the compound of the formula I in which m and n are each 1 and y is 0.

The elementary analysis is also in accord with the structure to be expected. The following values are found for $C_{24}H_{30}N_4O_8$:

| Found: | Calculated: |
|---|---|
| 57.30% C | 57.36% C |
| 6.10% H | 6.02% H |
| 11.19% N | 11.19% N |

EXAMPLE 5

Bis-anthranilate of the diol according to Example E 69.28 g (0.20 mol) of the cis/trans-cyclohexane-1,4-dicarboxylic acid bis-($\beta$-hydroxyethoxyethylamide) prepared according to Example E are stirred in a mixture of 50 ml of dimethylformamide and 100 ml of toluene at 80° C.

0.187 g of potassium hydroxide and 30.15 g of isatoic anhydride are added to the clear, ochre-coloured solution. The evolution of carbon dioxide shows that the reaction is proceeding in the desired manner. After 50 minutes, a further 0.187 g of potassium hydroxide and 25 g of isatoic anhydride are added. After a further 1.5 hours, 0.12 g of potassium hydroxide and 15 g of isatoic anhydride (total amount: 70.15 g=0.43 mol) are added. The reaction solution is stirred for a further 3 hours at 100° C. and is then worked up exactly as in Example 4.

This yields 116.7 g (99.8% of theory) of the desired product in the form of a brown, glassy-brittle product.

For purification, the product is dissolved in 200 ml of chloroform and the chloroform solution is extracted by shaking as described in Example 4. After working up as in Example 4, 67.4 g of a pale brown, clear, brittle resin which softens at about 50° C. are obtained.

The H-NMR and IR spectra are in accord with the compound of the formula I in which m, n and y are each 1 and X is p-cyclohexylene.

The gas chromatogram (conditions as in Example 3) shows that the sum of the the cis and trans compounds (dianthranilates) is approximately 85%. The product contains monoanthranilates as impurities.

As a result of the purification, the cis/trans ratio has shifted from the initial value of about 1:1 to 1:6.5.

EXAMPLE 6

Bis-anthranilate of the diol according to Example F 448.54 g (1.4 mols) of the adipic acid bis-($\beta$-hydroxyethoxyethylamide) prepared according to Example F are dissolved in a mixture of 650 ml of toluene and 300 ml of N,N-dimethylformamide, with stirring, at 80° C. 1.9 g of potassium hydroxide powder are added and 191.02 g of isatoic anhydride (technical grade product) are added all at once. A clear brown solution forms in the course of 5 minutes and the reaction is followed by the continual evolution of carbon dioxide.

After 1 hour, 1.0 g of potassium hydroxide powder and 170 g of isatoic anhydride are added. After a further 1.5 hours, 0.8 g of potassium hydroxide powder and 130 g of isatoic anhydride (total amount: 491.02 g, corresponding to 3.01 mols) are added. The reaction mixture is stirred and heated at 100° C. for 3.5 hours. It is cooled to 60° C. and filtered, the filtrate is completely concentrated at 115° C./195 Pa and the residue is dried to constant weight at 130° C./65 Pa. This yields 782 g (100% of theory) of the crude product in the form of a brown, brittle resin.

The product is dissolved in 1.3 liters of chloroform and purified with ammonia solution and water as mentioned in Example 3. The organic phase is concentrated and the residue is dried for 5 hours at 130°–135° C. under 58.5 Pa.

This yields 629 g (80.42% of theory) of a clear, pale brown, liquid product which is highly viscous at room temperature.

The thin layer chromatogram (Al/silica gel 60; solvent: methanol) then shows only the substance spot.

The H-NMR and IR spectra are in accord with the compound of the formula I in which m, n and y are each 1 and X is n-butylene. The gas chromatogram indicates a purity of 90%.

Elementary analysis gives, for $C_{28}H_{38}N_4O_8$:

| Found: | Calculated: |
|---|---|
| 60.05% C | 60.20% C |
| 6.90% H | 6.86% H |
| 10.16% N | 10.03% N |

USE EXAMPLES
EXAMPLES I TO VI

A liquid isocyanate prepolymer obtained from toluylene diisocyanate and polytetramethylene glycol and having an isocyanate content of 1.5 equivalents/kg and a viscosity of about 10000 mPa.s at 25° C. (available commercially under the name "Adipren L-167") was mixed with the bis-anthranilates according to the invention. The constituents of these mixtures were in each case mixed in the ratios and under the processing conditions indicated in Table 1 and 2. The following methods were used to determine the reactivity of the mixtures and their mechanical properties after curing.

DETERMINATION OF THE REACTIVITY

Using the bis-anthranilate according to Example 6 as an example, the improved processing conditions compared with MOCA are demonstrated by means of determining the reactivity by measuring the gel time on thermostat-controlled hotplates which were set at 100°, 120° and 140° C.

DETERMINATION OF THE MECHANICAL PROPERTIES OF THE ELASTOMERS

After intimate mixing under the conditions in each case indicated in Table 1, the resin/crosslinking agent mixtures listed in Table 1 and 2 were freed in vacuo from the air stirred in during the mixing and then poured into aluminium moulds, pre-treated with mould-release agents, to produce sheets with dimensions of 135×135×4 mm and 135×135×1 mm and crosslinked under the conditions indicated in Table 2.

Test pieces which corresponded to DIN 53,455, No. 4 were stamped out from the 4 mm thick sheets using a punch and the tests to determine the tensile strength and elongation at break were carried out on these. The remainder of the sheet was used for determining the Shore A hardness (DIN 53,505) and the impact resilience according to DIN 53,455.

Shaped pieces for determining the tear propagation resistance according to DIN 53,363 were cut out from the 1 mm thick sheet.

Table 1

| | Processing conditions and reactivity | | | | |
|---|---|---|---|---|---|
| Use Example | I | II | III | IV | V |
| Bis-anthranilate (diamine) | according to Example 1 | according to Example 2 | according to Example 3 | according to Example 4 | according to Example 5 |
| Appearance | pale yellow powder | brown, glassy solidified mass | brown-gray mass | brown, highly viscous mass | brown solidified mass |
| Melting point (°C.) | 114.5–119.5 | <50 | ~50 | — | <50 |
| Viscosity in mPa.s | — | 26900 at 80° C. | 1320 at 80° C. | 1530 at 80° C. | 17000 at 80° C. |
| Parts of bis- | | | | | |

Table 1-continued

| Processing conditions and reactivity | | | | | |
|---|---|---|---|---|---|
| anthranilate per 100 parts of prepolymer | 39 | 34.7 | 39.5 | 33.9 | 39.4 |
| Processing conditions in °C. | | | | | |
| Prepolymer | 100 | 80 | 80 | 80 | 80 |
| Reactant | 120 | 100 | 80 | 80 | 100 |

| Use Example | VI | Comparison a | Comparison b | Comparison c |
|---|---|---|---|---|
| Bis-anthranilate (diamine) | according to Example 6 | Bis-anthranilate of neopentylglycol*) | Bis-anthranilate of ethylene glycol*) | MOCA |
| Appearance | brown tacky mass | brown highly viscous mass | yellow-brownish powder | brownish powder |
| Melting point (°C.) | — | — | 124 | ~120 |
| Viscosity in mPa.s | 1360 at 80° C. | 1875 at 60° C. | — | — |
| Parts of bis-anthranilate per 100 parts of prepolymer | 41.9 | 25.1 | 20.3 | 16.0 |
| Processing conditions in °C. | | | | |
| Prepolymer | 80 | 80 | 80 | 80 |
| Reactant | 80 | 80 | 130 | 120 |
| Gel time at (minutes) | | | | |
| 100° C. | >90 | 1442 | 1437 | 7 |
| 120° C. | 42 | 33 | 45 | 4 |
| 140° C. | 13 | 18 | 26 | 3 |

*Compounds according to German Auslegeschrift 2,040,644

Table 2

| End characteristics after crosslinking | | | | | |
|---|---|---|---|---|---|
| Use Example | I | II | III | IV | V |
| Bis-anthranilate (diamine) | according to Example 1 | according to Example 2 | according to Example 3 | according to Example 4 | according to Example 5 |
| Crosslinking conditions (hours/°C.) | 6/120 | 6/120 | 6/120 | 6/120 | 6/120 |
| Appearance of the elastomers | yellow-brown, opaque | yellow, opaque | brown, transparent | pale brown, transparent | brown, slightly opaque |
| Shore A hardness (units) | 92 | 80 | 63 | 68 | 76 |
| Impact resilience (%) | 19 | 12 | 12.5 | 13 | 13 |
| Tensile strength (N/mm$^2$) | 43.4 | 40 | 23.5 | 37 | 13.8 |
| Elongation at break (%) | 390 | 430 | 460 | 475 | 495 |
| Tear propagation resistance (N/mm) | 83 | 70 | 25 | 35 | 61 |

| Use Example | VI | Comparison a | Comparisom b | Comparison c |
|---|---|---|---|---|
| Bis-anthranilate (diamine) | according to Example 6 | Bis-anthranilate of neopentylglycol *) | Bis-anthranilate of ethylene glycol *) | MOCA |
| Crosslinking conditions (hours/°C.) | 6/120 | 6/120 | 6/120 | 6.120 |
| Appearance of the elastomers | yellow, opaque | brown, transparent | pale yellow, transparent | yellow, opaque |
| Shore A hardness (units) | | | | |
| Impact resilience (%) | 19 | 8 | 9 | 26 |
| Tensile strength (N/mm$^2$) | 25.4 | 17.8 | 24.8 | 32 |
| Elongation at break (%) | 638 | 640 | 467 | 333 |
| Tear propagation resistance (N/mm) | 43 | 27 | 26.5 | 100 |

*Compounds according to German Auslegeschrift 2,040,644

EXAMPLES VII TO XI

A liquid, unmodified epoxide resin based on bisphenol A with an epoxide content of 5.3 equivalents/kg and a viscosity of 10800 mPa.s at 25° C. was mixed in equivalent ratios with bis-anthranilates according to the invention and the mixtures were melted together at 80° C. 4 g amounts of the mixtures thus obtained were poured into small aluminium dishes about 5 cm in diameter. The glass transition temperature of the moulded materials obtained after curing was determined using a Thermoanalyzer (Type TA 2000 from Mettler, Switzerland).

Table 3

| | Use as curing agent for epoxide resin | | | | | |
|---|---|---|---|---|---|---|
| Example | | VII | VIII | IX | X | XI |
| Bis-anthranilate | according to Example | 1 | 2 | 3 | 4 | 6 |
| | amount (parts by weight) per 100 parts by weight of epoxide resin | 78.0 | 78.0 | 88.8 | 67.8 | 75.3 |
| Curing (hours/°C.) | | 4/80 + 8/140 + 6/180 | | | | |
| Appearance of the moulded material | | brown, high gloss, scratch resistant | " | " | " | " |
| Glass transition temperature (°C.) | | 84 | 82 | 166 | 135 | 100 |

What is claimed is:

1. A bis-anthranilate of the formula I

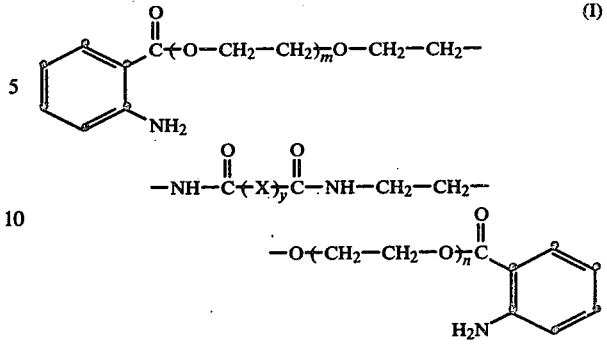

or a mixture of such bis-anthranilates, wherein in the formula m and n are each 0 or a number from 1 to 5 and the sum of m and n must be at least 1, y is 0 or 1 and X is an alkylene having 1 to 8 C atoms, para- or meta-phenylene or para-cyclohexylene.

2. N,N'-Bis-(anthranoyloxyethoxyethyl)-terephthalic acid diamide as a compound of the formula I according to claim 1.

3. N,N'-Bis-(anthranoyloxyethoxyethyl)-isophthalic acid diamide as a compound of the formula I according to claim 1.

4. N,N'-Bis-(anthranoyloxyethoxyethyl)-sebacic acid diamide as a compound of the formula I according to claim 1.

5. N,N'-Bis-(anthranoyloxyethoxyethyl)-adipic acid diamide as a compound of the formula I according to claim 1.

6. N,N'-Bis-(anthranoyloxyethoxyethyl)-oxalic acid diamide as a compound of the formula I according to claim 1.

7. N,N'-Bis-(anthranoyloxyethoxyethyl)-cis/transcyclohexane-1,4-dicarboxylic acid amide as a compound of the formula I according to claim 1.